May 13, 1947. D. G. REMPEL 2,420,443
METHOD AND APPARATUS FOR FORMING HOLLOW OBJECTS
Filed May 29, 1944 4 Sheets-Sheet 1
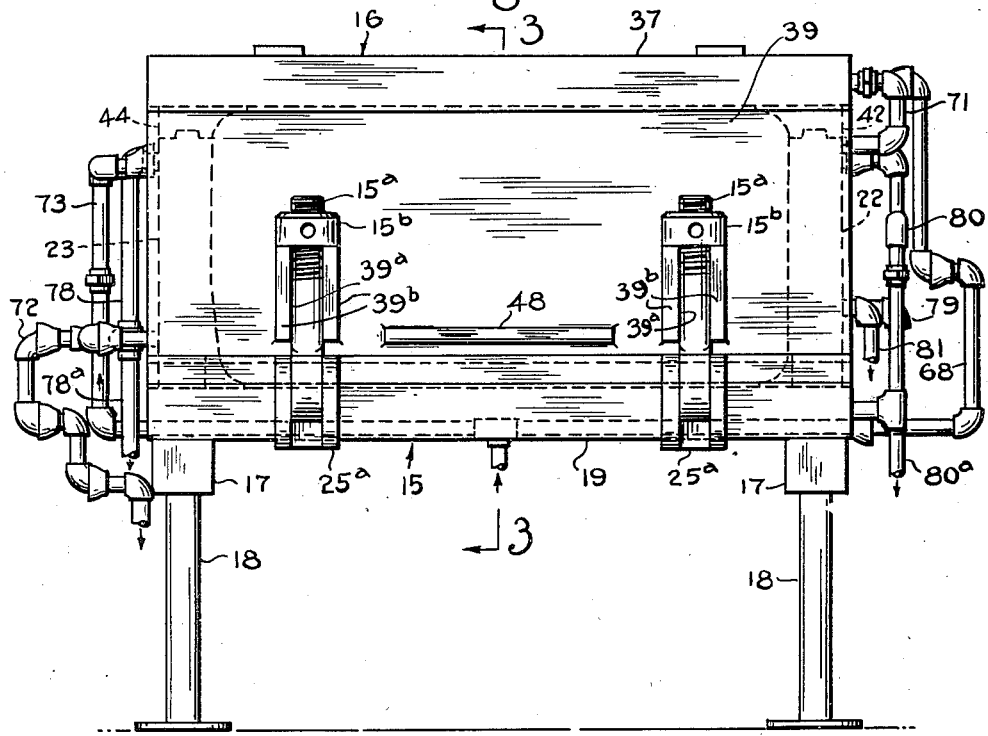
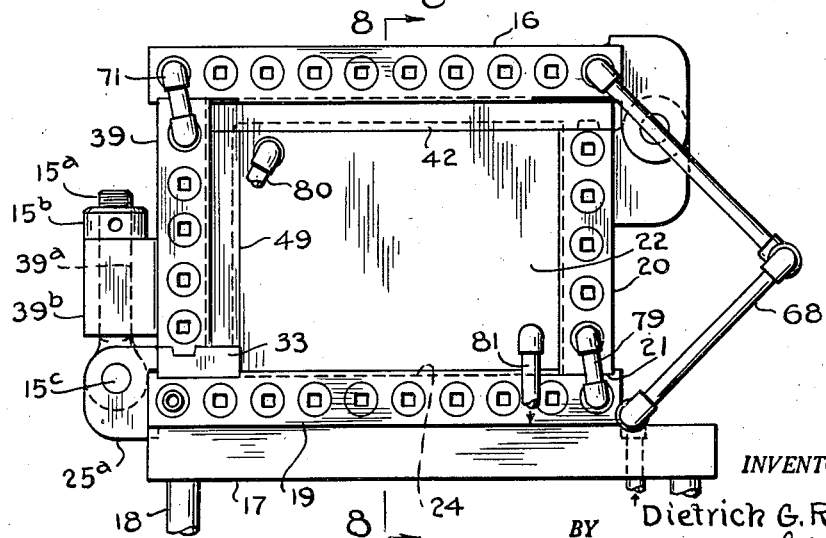
INVENTOR.
Dietrich G. Rempel
BY William Cleland
Attorney

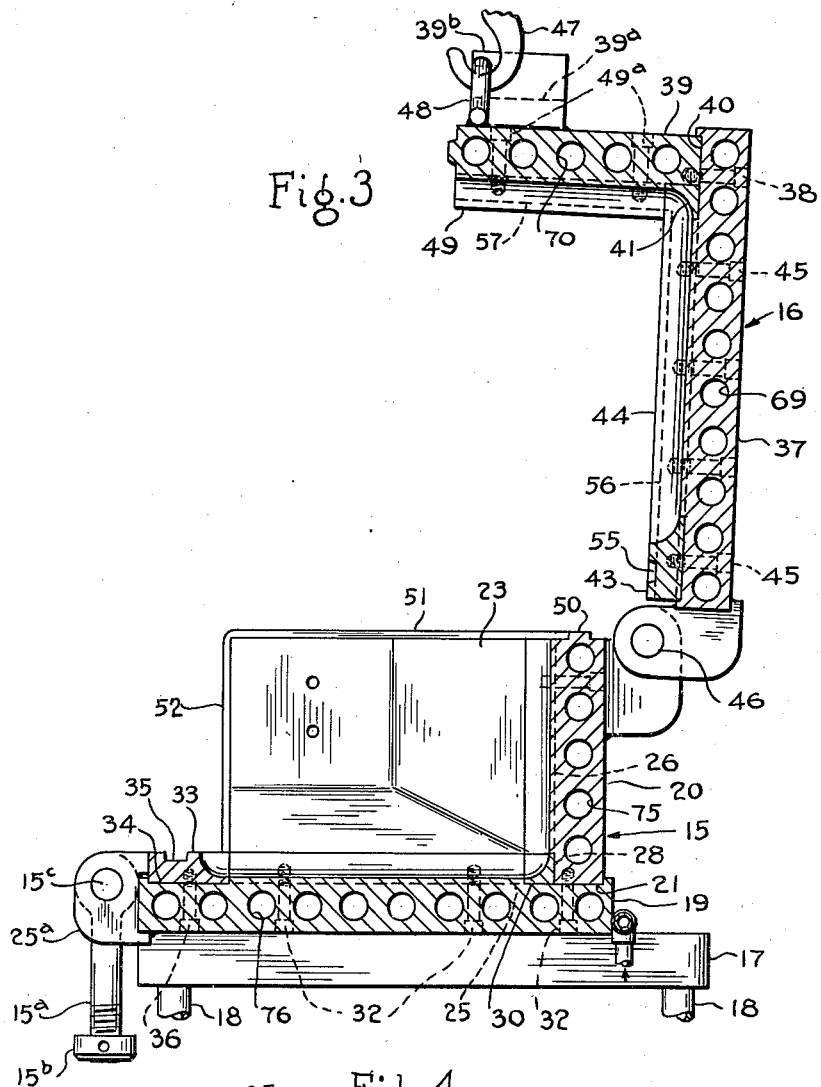
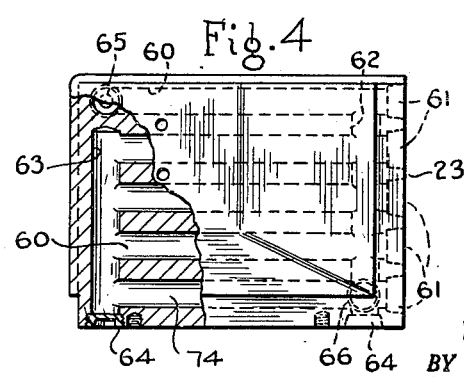

May 13, 1947.  D. G. REMPEL  2,420,443
METHOD AND APPARATUS FOR FORMING HOLLOW OBJECTS
Filed May 29, 1944  4 Sheets-Sheet 3

INVENTOR.
Dietrich G. Rempel
BY William Cleland
Attorney

May 13, 1947. D. G. REMPEL 2,420,443
METHOD AND APPARATUS FOR FORMING HOLLOW OBJECTS
Filed May 29, 1944 4 Sheets-Sheet 4
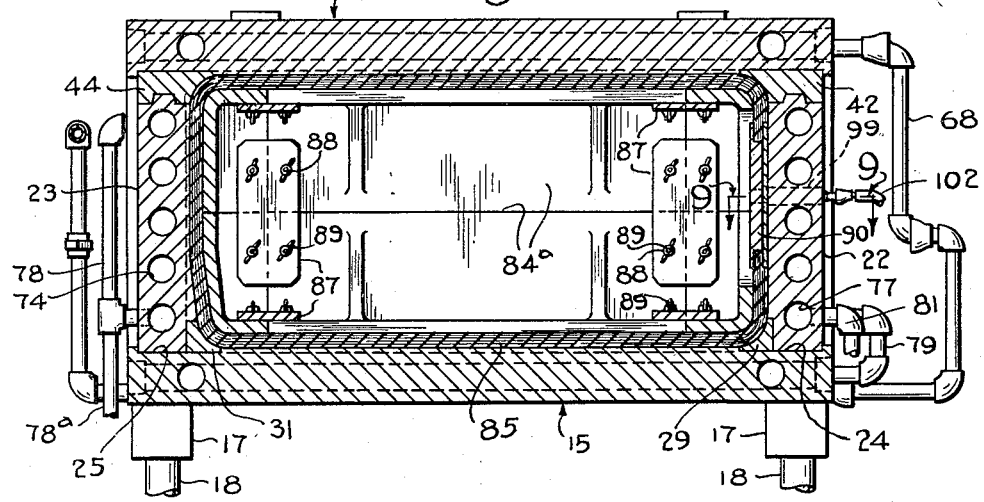
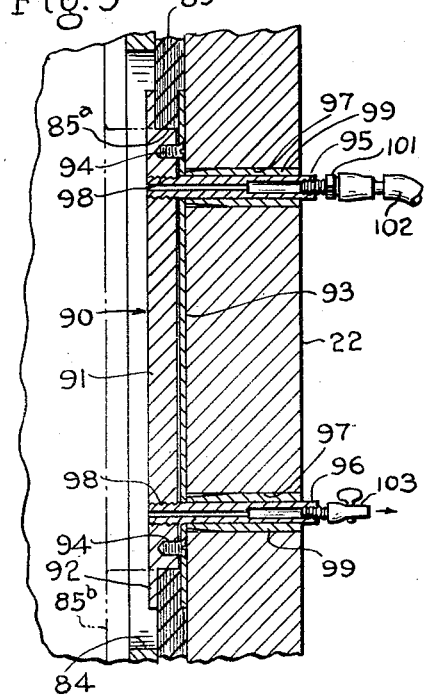
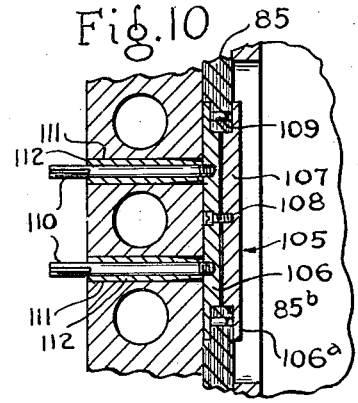
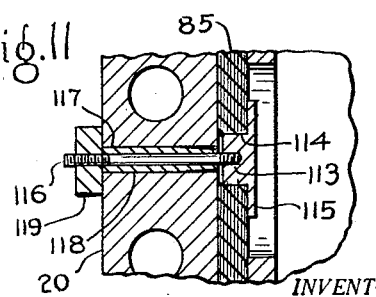
INVENTOR.
Dietrich G. Rempel
BY William Cleland
Attorney Patented May 13, 1947

2,420,443

UNITED STATES PATENT OFFICE 2,420,443

METHOD AND APPARATUS FOR FORMING HOLLOW OBJECTS

Dietrich G. Rempel, Akron, Ohio

Application May 29, 1944, Serial No. 537,773

7 Claims. (Cl. 18—35)

This invention relates to a method and apparatus for producing hollow objects, and in particular relates to a method and apparatus for making hollow articles from laminations of material, such as rubber, synthetic rubber, rubberized cord fabric, or other treated sheet materials, adapted to bond or fuse together under the influence of heat and pressure.

One object of the invention is to provide an improved method and apparatus of producing hollow articles of the character described, as for example fuel cells for aircraft, by which the articles are accurately shaped and formed to predetermined measurements with the layers thereof uniformly adhered or bonded together, and the completed articles being substantially free from irregularities, buckles, folds, wrinkles, air pockets or like defects commonly resulting from known methods utilized in the past.

Another object of the invention is to provide a method and apparatus for producing articles of the character described by which the cost of the equipment is greatly reduced, with a consequent material reduction in the cost of producing the articles.

Another object of the invention is to provide an improved jacketed vulcanizing or curing mold of simple and yet sturdy segmented construction, which facilitates the use of standard equipment such as planers, routers, drill presses, duplicators, etc., for machining and finishing operations, as well as permitting the use of templates of all types for accurately finishing or checking forming surfaces of the mold in segments whereby such a mold may be built and assembled relatively quickly with a high degree of accuracy, and at greatly reduced cost, and whereby substantial repairs, alterations or replacements may be made to one or more of the mold segments without necessarily affecting others.

Another object of the invention is to provide a vulcanizing or curing mold of segmented construction having means for effectively jacketing the segments to supply heating medium uniformly to all areas of the mold.

Still another object of the invention is to provide a segmented vulcanizing or curing mold of the character described, having improved means for securing the segments against separation due to internal pressure of the molds during vulcanizing or curing operations.

Yet another object of the invention is to provide apparatus of the character described having improved means for effectively sealing apertures in the article, such as apertures for valve fittings, manhole covers, etc., in fuel cells so that internal pressure may be applied to the article during vulcanization or curing thereof in the mold.

These and other objects of the invention will be manifest from the following brief description and the accompanying drawings.

Of the accompanying drawings:

Figure 1 is a front elevation of a vulcanizing or curing mold or press embodying the invention, the same being in a closed position.

Figure 2 is an end elevation thereof, partly broken away, as viewed from the right of Figure 1.

Figure 3 is a vertical cross-section, taken substantially at 3—3 in Figure 1, but in the open position of the mold.

Figure 4 is a typical detail view, partly broken away and in section, of one of the segments of the mold, illustrating the method of jacketing the mold.

Figure 8 is a vertical cross-section taken substantially at 8—8 in Figure 2, illustrating the mold in closed, loaded condition.

Figure 9 is an enlarged cross-section taken substantially at 9—9 in Figure 8, illustrating the method of sealing the manhole of a fuel cell loaded in the mold.

Figures 10 and 11 are vertical cross-sections, similarly illustrating methods of sealing apertures provided in the fuel cell for valve or other fittings.

Figure 5:
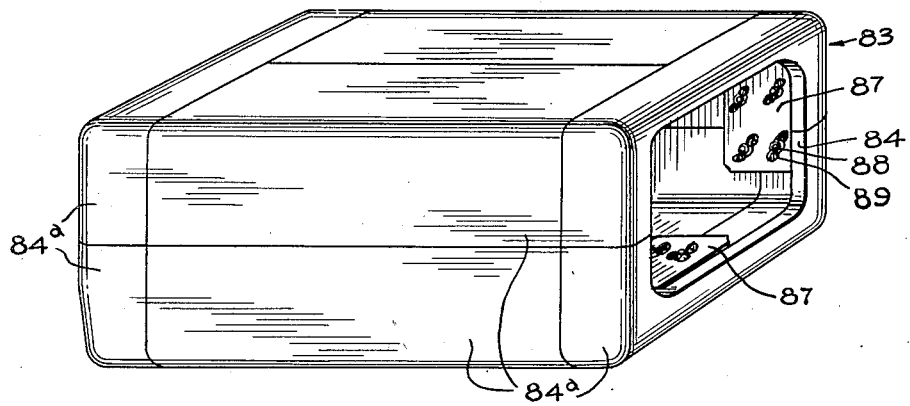
Figure 5 is a perspective view of a collapsible building form utilized in the improved method and apparatus embodying the invention.

Referring particularly to Figures 1 to 4 of the drawings, the numerals 15 and 16 designate relatively fixed and relatively movable segmented mold members respectively, constructed by securing together segments or plates in a manner to be described, the fixed member 15 being supported on cross-pieces 17, 17 mounted on legs 18, 18.

The fixed mold member may comprise a horizontal bottom plate or segment 19, suitably secured to the cross-pieces 17, a vertical back plate 20, the bottom edge portion of which is received in a groove or recess 21 in the upper face of plate 19 (see Figures 1 and 3), and spaced vertical end plates 22 and 23, similarly received in grooves or recesses 24 and 25 in said upper face of the bottom plate. The rear edge portions of end plates or segments 22 and 23 are similarly interengaged in grooves 26 in back plate 20. The bottom portions of the inner faces of plates 20, 22 and 23 are provided with recesses 28, 28 and the grooves 21, 24 and 25 are suitably widened, to receive fillet strips 29, 30 and 31 which are provided with spaced shoulders for reciprocal engagement with spaced shoulders provided by the grooves or recesses in the plates, whereby the strips are locked in position, as shown, when the vertical plates are secured to the bottom plate, as by means of screws 32, 32. A fillet strip 33 may be arranged across the front portion of bottom plate 19 in a groove or recess 34, and may be extended in width and provided with a transverse groove 35, to serve as a locking strip in a manner to be described, the strip 33 being secured to the bottom plate by means of screws 36.

The movable mold member 16 may comprise a top plate 37 having a front plate 39 secured thereto, as by screws 38, the upper edge of the front plate being received in a groove or recess 40. A fillet strip 41, similar to fillet strips 29 and 31, is provided at the intersecting inner corner of the top and front plates, and combined fillet and locking strips 42, 43 and 44, similar to combined fillet and locking strip 33, are secured to the top plate by means of screws 45, 45. In like manner, combined fillet and locking strips 49, 49 are secured at the ends of the front plate as by means of screws 49ª. Tongue portions or ribs 50, 51 and 52 are arranged along the top edges of back plate 20, end plates 22 and 23, and the front edges of said end plates, for interlocking engagement, in the closed position of the press, with corresponding grooves 55, 56 and 57 in the strips 43, 44 and 49. By means of the above-described interlocking or tongue-and-groove connections, supplementing the other securing means, the various mold segments or plates are effectively held together against the internal pressure of the mold. Beveled side edges on the interengaging tongue-and-groove portions serve to positively align the mold members 15 and 16 in the closed position thereof.

Mold member 16 is pivotally connected as indicated at 46, at the rear of mold member 15, to permit opening the mold, which is accomplished by means of a suitable hoisting device connected at 47 to a lug 48 secured to front plate 39, in the manner illustrated in Figure 3. The mold members 15 and 16 are clamped in closed position by means of clamping bolts 15ª, 15ª pivoted at 15ᶜ between spaced ears 25ª, 25ª on mold member 15, and engageable in slots 39ª in lugs 39ᵇ, 39ᵇ on mold member 16, the bolts being held in this engaged position by turning nuts 15ᵇ, threaded on the bolts 15ª, against the tops of lugs 39ᵇ.

The segmented mold construction described above, greatly facilitates both manufacturing and assembling the mold. Due to the flat nature of the plates the interior surfaces thereof, for forming surfaces corresponding to panel or like portions of the article to be produced, may be machined or finished by means of tools and equipment which could not readily be used for cast types of mold construction. The improved segmented construction also lends itself to greater accuracy in providing the cavity surfaces, particularly for producing hollow articles of irregular shape, such as fuel cells for airplanes, and also simplifies the making of changes or corrections in the mold design because one or more of the plates or segments may be altered or replaced without necessarily removing or disturbing others.

Referring to Figure 4, there is shown a detail view of end plate 23, removed from the mold, this plate being typical of all segments of the mold with particular regard to the method of jacketing the mold for circulation of fluid heating medium. To this end, a series of passages 60 are bored in the direction of the plane of the plate from one edge thereof, the open ends of the bores being closed with plugs 61, and bores 62 and 63 are made at right angles to bores 60, adjacent opposite ends thereof, the open ends of these bores being similarly plugged at 64, 64 thereby providing a winding passage. Inlet and outlet connections, 65 and 66, communicating with remote ends of the passage may connect the plate in a fluid-heating circuit, as will be described.

Fluid heating medium, such as steam from a suitable source (not shown), is supplied to the movable mold member 16 through flexible inlet conduit 68 connected to top plate 37, through a circulating passage 69 therein, and a similar passage 70 in front plate 39, chambers 69 and 70 being connected by a conduit 71 between the two plates, and the steam being exhausted through a flexible conduit 72 (see Figures 1, 2 and 8). The fixed mold member 15 is similarly supplied in a separate circuit from said source, through an inlet conduit 73, through circulating chambers 74, 75, 76 and 77 in plates 23, 20, 19 and 22, respectively, the passages of these plates being connected through conduits 78, 79 and 80, and the steam being exhausted through an outlet conduit 81. Extensions 78ª and 80ª are provided on connecting conduits 78 and 80 to connect with suitable traps (not shown) for carrying off condensation.

For the purposes of the present invention, a collapsible form or core 83, best shown in Figures 5 and 8, is utilized. This form, which may be of wood, metal or other material, is of the same exterior shape as the mold cavity, but is smaller by substantially the thickness of the wall of the article to be produced, so that the outline of an article built on the form will closely approximate the outline of the mold cavity.

The form 83 is made with an opening 84 corresponding to a manhole 85ª in the article 85 to be built thereon, and is formed with a plurality of abutting sections 84ª, 84ª of such proportions that they are each removable through said manhole of the article, as will be described later. The sections 84ª are secured in abutting relation by means of splice plates 87 secured at intersections of two or more abutting form sections, by means of bolts 88, 88 and wing nuts 89. Splice plates 85 are also removable through the manhole of the article.

Referring particularly to Figure 9, there is shown means 90 for sealing the opening 85ª so that pressure may be applied within article 85 loaded in the mold (see Figure 8). For this purpose, a plate 91, adapted to fit snugly in opening 85ª, is provided with a peripheral flange 92 arranged to overlie to a substantial extent the marginal portions of said opening. The opening 84 in the form 83 preferably is larger than opening 85ª to facilitate removal of various parts. During the operations of building the article, however, an adapter frame 95ᵇ indicated in chain-dotted lines in Figure 9, is utilized. When the article has been built, as will be subsequently described, plate 91 is readily insertable through opening 85ª and may be accurately held in position by clamping action of a plate 93, secured thereto by means of screws 94, the marginal portion of plate 93 engaging the edge portions around opening 85ª. A slight clearance may be provided between plates 91 and 93, in the assembled condition thereof, so that internal pressure against plate 91 will hold it in self-sealing engagement with the article, the area of the inside face of the plate 91 being substantially larger than the area of the opening.

When the article 85 on building form 83 is loaded in the mold, with the sealing means 90 clamped in place, a pair of stems or tubes 95 and 96 may be inserted through apertures 97, 97, in mold plate 22, said apertures being of substantially greater diameter than the diameter of the stems, which are then screwed in threaded apertures 98, 98 in plate 91, the stems preferably protruding outwardly of the mold (see Figure 9). Tapered sleeves 99, 99 are then receivable on the stems 95, 96 and in the apertures 97 as shown. Thus, if the stems 95 and 96 are not exactly centered with respect to apertures 97, the sleeves received on said stems are guided into the apertures by means of the tapered ends of the sleeves, thereby properly to orient the stems. A fitting 101 may then be threaded on the outer end of stem 95 for releasable connection of an inlet conduit 102 from a suitable source (not shown) of fluid pressure medium such as air, for applying pressure to the interior of the article. An outlet valve 103 may be similarly threaded on the end of stem 96 for exhausting pressure fluid from within the article.

In Figure 10 is illustrated means 105 similar to means 99, for sealing a relatively smaller valve or fitting opening in article 85, spaced plates 106 and 107 corresponding to plates 91 and 93 being clamped together as shown by screws 108. Pins 109, 109 on extended flange 106a of plate 106 coordinate with preformed holes in article 85 to orient the sealing means with respect thereto. To orient the article properly in the mold, a pair of pins 110, 110 are insertable in relatively larger apertures 111 in the mold plate or wall, the pins being centered by tapered sleeves 112 received thereon and inserted in said apertures, substantially as previously described.

In Figure 11 is shown another type of sealing device for apertures in an article 85. A member 113 is adapted to be received in an aperture 114, with a flange extension 115 thereof clamped against the inner edge portions around the aperture by means of a pin 116 received through a relatively large aperture 117 in the mold plate 20 and threaded into member 113, the pin being oriented by means of a tapered sleeve 118 received thereon and inserted in aperture 117, as previously described, and clamping pressure being applied by means of a nut 119, threaded on an outwardly extended end of the pin, against the outer face of the mold plate. Because the inner face of member 113 is of greater area than aperture 114 pressure fluid, supplied to the interior of the article through inlet connection 102, applies desired pressure to said inner face effectively to seal the aperture independently of the clamping pressure of nut 119.

In carrying out the improved method embodied herein as for manufacturing fuel cells for airplanes, a plurality of plies 121, 121 of flexible sheet material are cut to suitable size and shape and built on collapsible form 83 (see Figure 5) to provide desired wall thickness (see Figures 6 and 7) in known manner. During the ply-building operations, removable frames or fittings, such as frame 85b indicated in Figure 9, are utilized to facilitate forming about the various fitting openings in the article, so that the corresponding openings in the form may be relatively larger to facilitate insertion and removal therethrough of various parts, such as the sealing devices described above and segments of the form itself.

Figure 7:
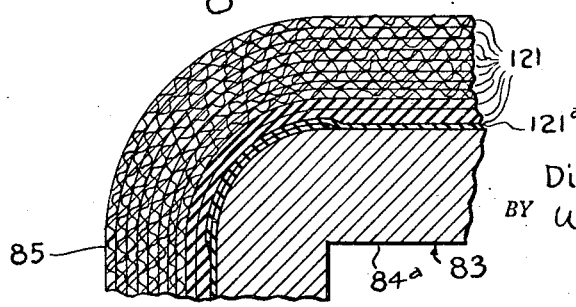
Figure 7 is an enlarged fragmentary cross-section, taken substantially at 7—7 in Figure 6.

The article 85 thus performed is made as accurately as possible to be substantially of the same shape and size externally as the forming cavity of the mold previously described. Different kinds of material may be utilized according to conditions, but for the purpose of the present example, the layers 121 preferably are either impregnated or coated with heat-fusible or heat-bonding substance. The various layers may include self-sealing or puncture-proof rubber, rubberized cord fabric, and a stiffening glass fabric, with one or more layers of pressure-fluid impervious material 121a, such as neoprene or rubber, on the interior of the article (Figure 7).

Figure 6:
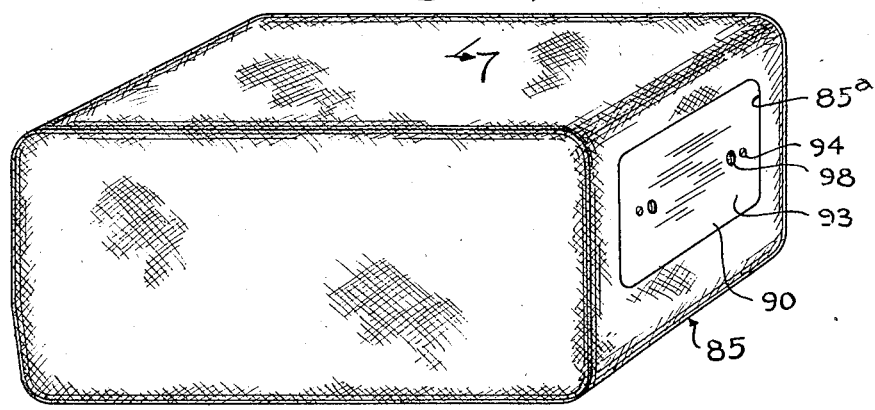
Figure 6 is a similar perspective view illustrating an airplane fuel cell built on the building form.

In building up the layers 121 of the article the openings such as openings 85a, 85a and 114, are provided as previously described for various fittings to be applied subsequent to completion of the article. When all of the plies have been applied, as shown in Figures 6 and 7, plates 91 and 107 are insertable in the opening 85a and the plates 93 and 107 may be clamped thereto (see Figure 9). Similarly the sealing devices shown in Figures 10 and 11 may be applied, but in certain cases it may be desirable to apply these prior to installation of the sealing means of Figure 9.

Next, the preformed article and form (see Figure 6) are loaded into the mold while the latter is in the open position shown in Figure 3. While the mold is still open the various fitting openings may be oriented in the mold cavity as previously described in connection with Figures 9, 10 and 11. At this time the air inlet fittings and connections 101 and 102 may be attached to stem 95 and outlet fitting 103 may be attached to stem 96. The mold may then be clamped in closed position by means of clamping bolts 15a described above.

With the mold closed as shown in Figures 1, 2 and 8, the mold segments are heated to desired temperature by circulation of steam therethrough, and compressed air is supplied from conduit 102, through stem 95 to the interior of form 83, valve 103 being closed. As the joints between the form sections are not designed to be air-tight, the air pressure is conveyed through the joints and applied directly against the interior wall surface of the article, thereby uniformly to press the same against the mold cavity surface. As the article is preformed to substantially finished proportions little or no stretching of the material thereof takes place and the plies are effectively bonded together into an integral structure.

At the end of the curing or vulcanizing period, the air pressure and the steam supply are cut off, the air pressure being vented through valve 103 to permit opening the mold. After removal of the fittings, stems, pins, sleeves, etc., described in connection with Figures 9, 10 and 11, the article is removable from the mold.

Upon such removal of the article, sealing device 99 is readily removable by removing screws 94 (Figure 9), thereby releasing outside plate 93, after which plate 91 may be readily withdrawn endwise through opening 85a. Removal of sealing means 99 permits access to the interior of the form for removal of splice plates 87, after which the various form sections 84a may be withdrawn one at a time through manhole 84. The sealing devices 105 and 115 are readily removed either before or after removal of the form sections.

The form 83, of course, is adapted to be repeatedly assembled and collapsed, as described, as compared with certain known prior art forms which are used only for preforming one article.

Thus has been provided an improved method and apparatus which effectively accomplishes the stated objects of the invention. Articles such as airplane fuel cells, produced in this manner are infinitely superior in quality to those produced by prior art methods. In addition to many other advantages, the cost per cell has been immeasurably reduced and the number of rejected cells has been reduced to a relatively small percentage.

Modifications of the invention may be resorted to without departing from the spirit thereof, or the scope of the appended claims.

What is claimed is:

1. A method of producing hollow articles of the character described, comprising the steps of preforming the article material on a collapsible form substantially closely to the predetermined outside shape and size of the finished article, treating said preformed article in an article-forming cavity of a sectional mold of similarly predetermined shape and size while applying pressure fluid directly against the interior wall surface of said preformed article, thereby to press the wall of the preformed article against the surface of said cavity, and thereafter collapsing and removing said form from the article.

2. A method of producing hollow articles of the character described, comprising the steps of preforming heat-fusible material on a collapsible form, placing the preformed article in a mold with said form retained therein, applying pressure fluid directly against the interior wall surface of the article while under the influence of heat, thereby to press the wall of the article against the surface of said cavity and fuse the preformed article into a unitary structure, removing said article from said mold, and collapsing said form within the article to remove the same.

3. A method of producing hollow articles of the character described having one or more openings therein, comprising the steps of preforming one or more layers of heat-fusible material on a collapsible form substantially closely to predetermined outside shape and size of the finished article, sealing the opening or openings provided in the article against fluid pressure, heat-curing said preformed article in an article-forming cavity of a mold having similarly predetermined shape and size, applying pressure fluid directly against the interior wall surface of said article, thereby to press the wall of the article against the surface of said cavity, relieving said pressure from within said article, removing said article from said mold, and collapsing said form and removing the same from within the article through an opening therein.

4. A method of producing hollow articles of the character described having an opening therein, comprising the steps of building one or more plies of heat-bonding, fluid-pressure impervious material on a collapsible form of predetermined shape and size, building one or more additional plies of heat-bonding material on said form to preform an article substantially closely to the outside shape and size of the finished article, sealing said opening provided in the article against fluid pressure with means provided for admitting pressure fluid to the interior of the article, heat-curing said preformed article in the article-forming cavity of a mold of similarly predetermined shape and size while said pressure fluid is applied directly against the interior wall surface of said article, thereby to press the wall of the article against the surface of said mold cavity and bonding said plies together, relieving said fluid pressure from within said article, removing said article from said mold, and collapsing said form and removing the same from within the article through said opening.

5. The combination with a sectional mold having an article-forming cavity therein for forming hollow articles adapted to be bonded under the influence of heat and pressure in the mold, of a rigid apertured form adapted to be removably received in said mold cavity with an article preformed thereon, and means for supplying pressure fluid to said form and through said apertures thereof to apply pressure fluid directly against the interior wall of said preformed article, thereby to press the article against the surface of said cavity.

6. The combination with a sectional mold having an article-forming cavity therein for forming hollow articles having an opening or openings therein, said articles being of material adapted to be bonded in the mold under the influence of heat and pressure, of a hollow sectional form adapted to be removably received in said mold cavity with an article preformed thereon, releasable means for securing the sections of said form together, means for sealing the opening or openings in a preformed article on said form, and means for supplying pressure fluid to the interior of said form received in the mold and through apertures provided by the joining portions of the form sections, thereby to apply pressure fluid directly to the interior wall surface of the preformed article to press the same against the surface of said article-forming cavity, said form sections being proportioned to be received through an opening in an article built on the form upon releasing said releasable means thereof.

7. The combination with a sectional mold having an article-forming cavity therein for forming hollow articles, said articles being of material adapted to be bonded in the mold under the influence of heat and pressure, of a hollow sectional form adapted to be removably received in said mold cavity with an article preformed thereon, releasable means for securing the sections of said form together, and means for supplying pressure fluid to the interior of said form received in the mold and through apertures provided by the joining portions of the form sections, thereby to apply pressure fluid directly to the interior wall surface of the preformed article to press the same against the surface of said article-forming cavity, said form sections being proportioned to be received through an opening in an article on the form upon releasing said releasable means thereof.

DIETRICH G. REMPEL.

REFERENCES CITED

The following references are of record in the file of this patent:

UNITED STATES PATENTS

| Number | Name | Date |
|---|---|---|
| 1,307,798 | Stephan | June 24, 1919 |
| 1,335,783 | Dorsey | Apr. 6, 1920 |
| 1,289,983 | Weida | Dec. 31, 1918 |
| 1,585,642 | Bello | May 25, 1926 |
| 1,234,065 | Miller | July 17, 1917 |
| 1,718,925 | Hudson | June 25, 1929 |
| 1,662,018 | Van Orman | Mar. 6, 1928 |
| 270,342 | Sargent | Jan. 9, 1883 |

FOREIGN PATENTS

| Number | Country | Date |
|---|---|---|
| 13,406 | Australia | July 18, 1923 |